United States Patent
Doan et al.

(10) Patent No.: US 8,046,607 B2
(45) Date of Patent: Oct. 25, 2011

(54) METHOD, DEVICE AND SYSTEM FOR PROVIDING INFORMATION FROM A COMPUTING DEVICE WHEN THE COMPUTING DEVICE IS IN A HIBERNATE OR POWER OFF STATE

(75) Inventors: Christopher Hoang Doan, Austin, TX (US); David Kulczar, Austin, TX (US); Leonel Saenz, III, Austin, TX (US); Thanh K. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 12/154,208

(22) Filed: May 21, 2008

(65) Prior Publication Data
US 2008/0228955 A1   Sep. 18, 2008

(51) Int. Cl.
G06F 1/00 (2006.01)
G06F 1/26 (2006.01)
(52) U.S. Cl. ......................................................... 713/300
(58) Field of Classification Search .................. 713/300, 713/320
See application file for complete search history.

(56) References Cited

U.S. PATENT DOCUMENTS

| 5,938,771 | A * | 8/1999 | Williams et al. | 713/310 |
|---|---|---|---|---|
| 6,260,111 | B1 * | 7/2001 | Craig et al. | 711/115 |
| 7,330,118 | B2 * | 2/2008 | Durham et al. | 340/572.1 |
| 2004/0003296 | A1 * | 1/2004 | Robert et al. | 713/300 |
| 2007/0097933 | A1 * | 5/2007 | Kuc | 370/338 |

* cited by examiner

*Primary Examiner* — Mohammed Rehman
(74) *Attorney, Agent, or Firm* — Jeffrey LaBaw; Darcell Walker

(57) ABSTRACT

In a computing network containing multiple computing devices, a network card in a computing device provides the ability for the computing device to transmit specific types of information while the computing device is in an inactive state. The network card contains processing capabilities that enable it to detect and receive an inquiry directed to that device, process the inquiry, retrieve the requested data which is stored in the network card and transmit that information to the requestor. The ability of the network card to perform this enables system administrators to perform certain system maintenance functions while a computer may be in a power off or hibernate state instead if having to power on the computing device.

12 Claims, 7 Drawing Sheets

METHOD, DEVICE AND SYSTEM FOR PROVIDING INFORMATION FROM A COMPUTING DEVICE WHEN THE COMPUTING DEVICE IS IN A HIBERNATE OR POWER OFF STATE

FIELD OF THE INVENTION

The invention relates to a device and system for providing information about the characteristics of a device on a computing network and in particular to a device and system for providing information about the characteristics of a device in response to an inquiry when the device is in a power off or hibernate state.

BACKGROUND OF THE INVENTION

In today's business world, reliable and efficient access to information has become an important asset in the quest to achieve a competitive advantage. In the business environment, file cabinets and mountains of papers have given way to computers that store and manage information electronically. Coworkers thousands of miles apart can share information instantaneously, just as hundreds of workers in a single location can simultaneously review research data maintained online.

Computer network technologies are the glue that binds these elements together. The public Internet allows businesses around the world to share information with each other and their customers. The global computer network known as the World Wide Web provides services that let consumers buy books, clothes, and even cars online, or auction those same items off when no longer wanted.

During the operations of a computing device, there are intervals of time when the device is not in use. For many, at the end of a workday, the computing device is simply turned off. Further, devices are equipped with technology that will detect an extended period of inactivity. At the detection of this inactivity, the device will automatically go into a hibernate or power save mode in order to save power. Detection of activity such as the movement of an I/O device or the entering of a character via a connected keyboard I/O device can cause the computing device to come out of the hibernated state.

In some instances, it may be desirable to access a device on a computing network that is turned off or is in a hibernate state. In this case, providing the capability to start or wake up a computer from a remote location can facilitate remote access to a computer network (e.g., a LAN). This wake up feature is advantageous to a user desiring access to a computer from a remote location. This feature is also advantageous to a network administrator, allowing the administrator to perform, for example, maintenance activities on a computer system from a remote location.

A standard has been developed for allowing a network computer, which is in sleep mode to be awakened. More specifically, Advanced Micro Devices (AMD) of Santa Clara, Calif., has developed a technology referred to as the Magic Packet technology. In the Magic Packet technology, assuming, for example, that an Ethernet controller is running and communicating with the network, the computer's power management hardware or software puts the Ethernet controller into the Magic Packet mode prior to the system going to sleep. Once in the sleep mode, the computer will be awakened when a Magic Packet is detected. That is, incoming data will be monitored until the specific sequence comprising the Magic Packet is detected. The Magic Packet technology and the associated standard (generally referred to as the Wakeon LAN standard) are well known in the art.

U.S. Pat. No. 6,260,111 incorporates wake up technology to manage power used by a network computer. In this system, a network computer receives a network card, such as a smart card, which includes a processor and storage for providing secure user information. Detecting the presence in the network computer of the network card and accessing the network card to obtain user specific information control the network computer. The power management of the network computer may then be controlled based upon the user specific information on the detailed network card. This system also provides user information to a network computer by storing user specific information on a network card that includes a processor and storage location such that information stored on the network card may only be accessed through the processor of the network card so as to provide secure data on the network card. The network card may then be provided to a network computer and accessed to obtain user specific information independent of the network connections of the network computer. User identification information, which may be encrypted, is stored on the network card and validated to permit access to the network computer. User activity may be tracked or monitored, including transitions between and time spent in power modes, to establish power management preferences for a user on the network. The network computer may be activated and deactivated by the detected presence or absence of the network card or smart card, so that the network card may act as an intelligent "power on" for the network computer.

Although U.S. Pat. No. 6,260,111 provides advancements in wake up technology, this system has limitations. This system does not allow any transmission of data while the computer is powered off, unless the smart card is manually and physically plugged into a computer to manually transfer the data. This system monitors when certain accounts put a computer into certain modes, such as standby power off, power on, hibernate, etc. The card has to be inserted into a special port and information is transferred to the computer central processing unit. Also inserting the smart card could be a way to power on a computer, providing another security mechanism for multi-user computers. Using their card you could accurately document who used which computer and when the use occurred.

Although wake up technology can provide the ability to access a computer from a remote location, in some instances, there is a need to do maintenance or administrative activities on a computing device that is attached to a network but is turned off or in a hibernate state. The current approach is to turn on the computing device prior to initiating the maintenance or administrative activities. This approach is very time consuming and inefficient. There remains a need for a method, system and device that can allow administrative activities on a hibernating or power off computing device without the need to power on the device prior to the initiation of the activity. These activities can include the transmission of certain information from the computing during the hibernate state.

SUMMARY OF THE INVENTION

It is an objective of the present invention to provide a computing network system in which an administrator can interface with a computing device that is in a hibernate or power off state without the need to activate the device prior to the interfacing with the device.

It is a second objective of the present invention to provide a computing device that can receive an inquiry and respond to that inquiry while the computing device is in a hibernate or power off state.

It is third objective of the present invention to provide a network card for insertion into a computing device that will enable the computing device to receive an inquiry and respond to that inquiry while the computing device is in a hibernate or power off state.

It is a fourth objective of the present invention to provide a method that will enable a network administrator to submit an inquiry to and receive a respond from a computing device that while the computing device is in a hibernate or power off state.

It is a fifth objective of the present invention to provide a method that will enable that will enable a computing device to receive an inquiry from a network administrator and respond to that inquiry while the computing device is in a hibernate or power off state.

In one aspect, the present invention relates to computing device connected to a computing network in which a network administrator can communicate with the computing device when that connected computing device is in a hibernate or power off state. This system includes one or more computing devices connected to form a computing network. This network can be a local area network (LAN) or a wide area network such as the Internet. The connected computing device contains a card that has the capability to receive network inquiries and transmit predetermined information in response to network inquires without formally starting up the hibernating or powered off computing device.

In another aspect of the invention, a network card is provided to facilitate receipt of and response to network inquiries. This card may be a smart card in that a central processing unit and memory are provided on the card. When the network card is placed in the computing device, the network computer may communicate with the smart card central processing unit. The card can contained certain predetermined data about the computing device that can be transmitted to a network administrator in response to the receipt of a network inquiry.

A third aspect of the invention is a method to communicate with a computing device that is in a hibernate or powered off state without the need to wake up the computing device. This method includes the steps of detecting a network transmission to at a computing device; identifying at the information desired in the network transmission; transmitting the identified information to the requestor of the information.

DETAILED DESCRIPTION OF THE INVENTION

Figure 1:
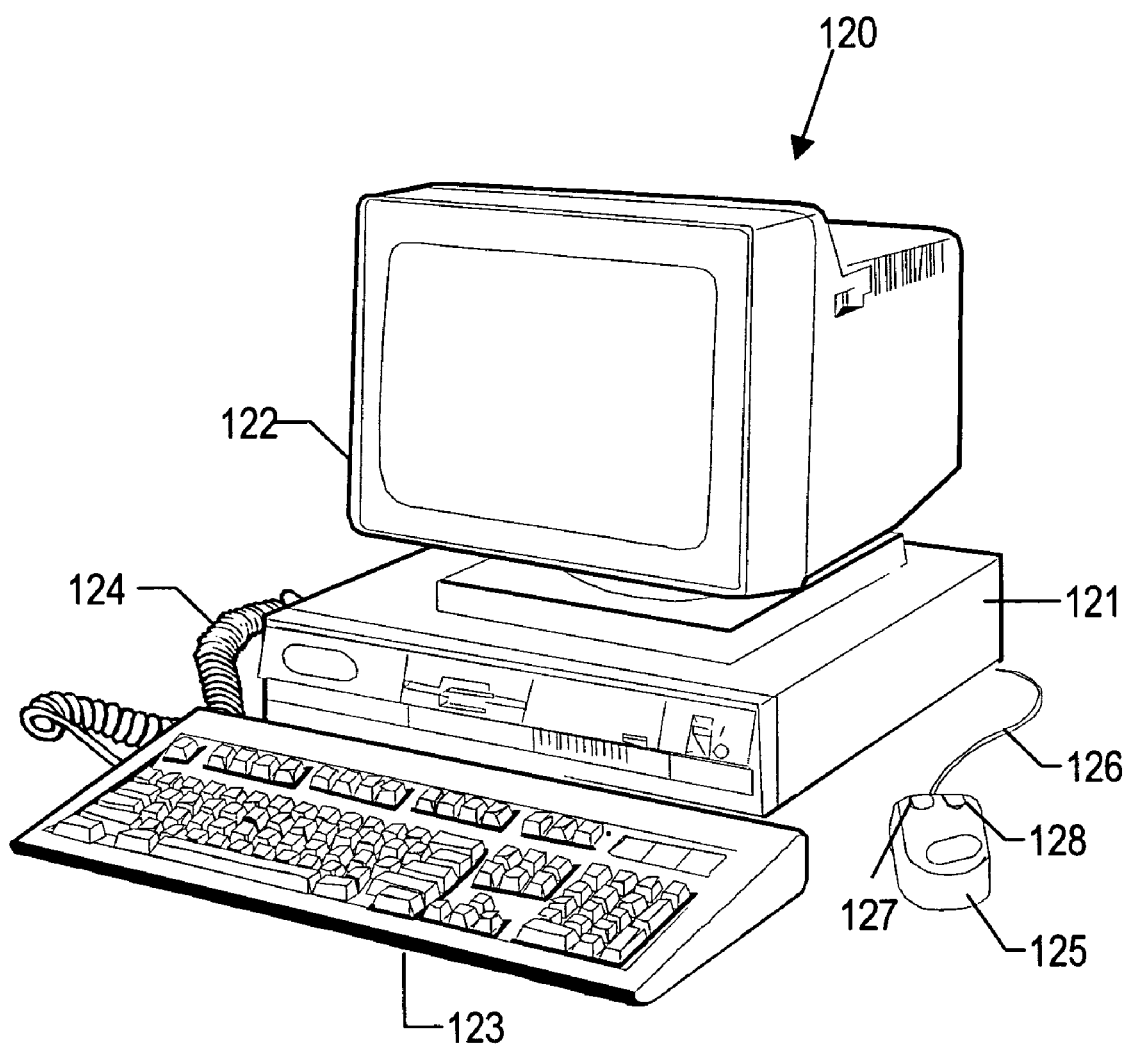
FIG. 1 is a pictorial representation of a personal computing device, which may be used in implementation of the present invention.

With reference now to FIG. 1, there is depicted a pictorial representation of computing device 100 which may be used in implementation of the present invention. Although the invention is described in terms of the device illustrated in FIG. 1, other types of electronic devices capable of transmitting and receiving information can be used in the implementation of the present invention. As seen in FIG. 1, data processing system 100 includes processor 102 that preferably includes a graphics processor, memory device and central processor (not shown). Coupled to processor 102 is video display 104 which may be implemented utilizing either a color or monochromatic monitor, in a manner well known in the art. Also coupled to processor 102 is keyboard 106. Keyboard 106 preferably comprises a standard computer keyboard, which is coupled to the processor by means of cable 108. Also coupled to processor 102 is a graphical pointing device, such as mouse 110. Mouse 110 is coupled to processor 102, in a manner well known in the art, via cable 112. As is shown, mouse 110 may include left button 114, and right button 116, each of which may be depressed, or "clicked", to provide command and control signals to data processing system 100. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 100 may be implemented utilizing a personal computer.

Figure 2:
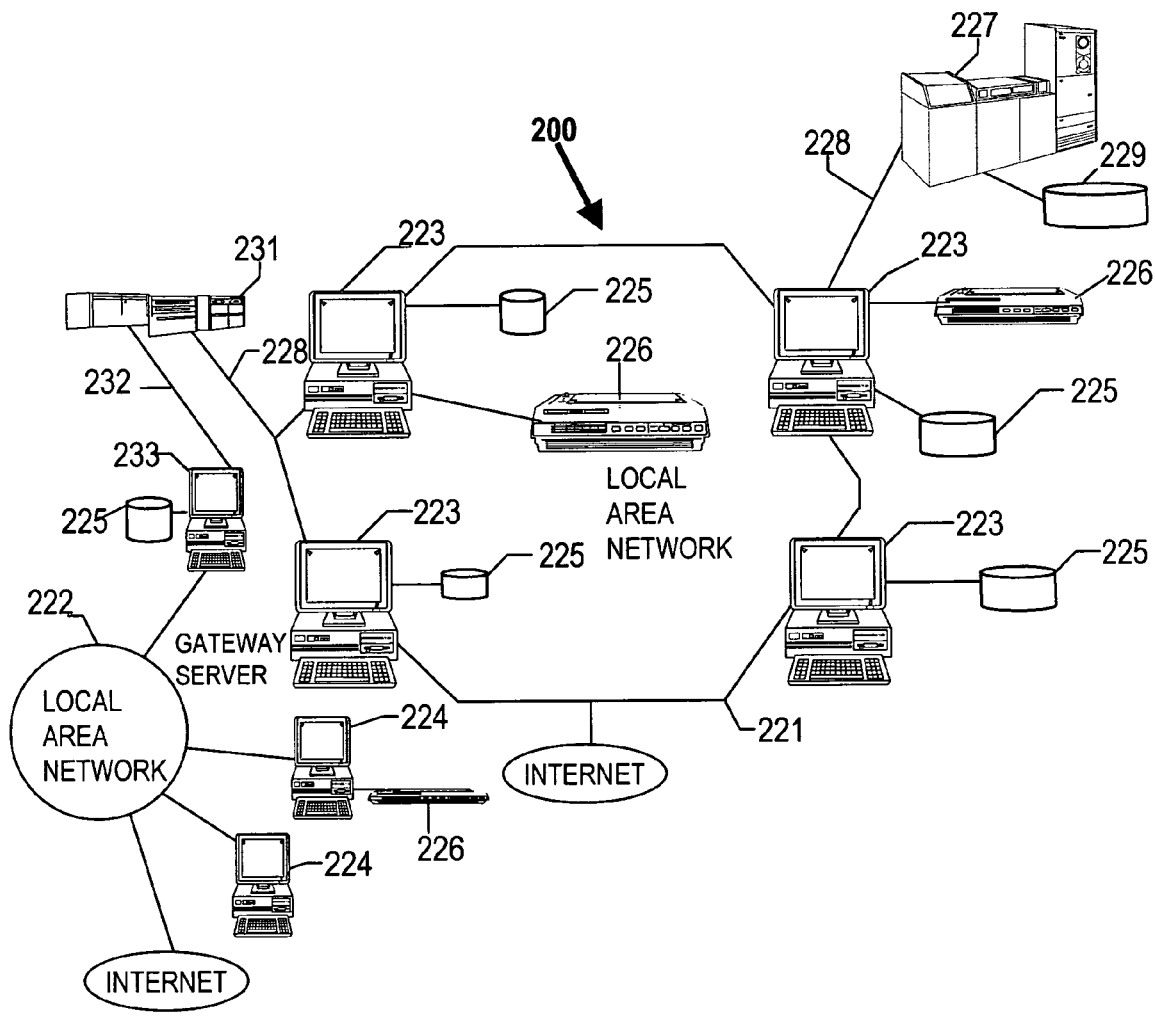
FIG. 2 is a pictorial illustration of a computing network having multiple computing devices.

FIG. 2 is a pictorial representation of a distributed computer network environment 220 in which one may implement the method and system of the present invention. As may be seen, distributed data processing system 220 may include a plurality of networks, such as Local Area Networks (LAN) 221 and 222, each of which preferably includes a plurality of individual computers 223 and 224, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 225 and/or a printer/output device 226. One or more such storage devices 225 may be utilized, in accordance with the method of the present invention, to store the various data objects or documents which may be periodically accessed and processed by a user within distributed data processing system 220, in accordance with the method and system of the present invention. In a manner well known in the prior art, each such data processing procedure or document may be stored within a storage device 225 which is associated with a Resource Manager or Library Service, which is responsible for maintaining and updating all resource objects associated therewith.

Still referring to FIG. 1, it may be seen that distributed data processing system 220 may also include multiple mainframe computers, such as mainframe computer 227, which may be preferably coupled to Local Area Network (LAN) 221 by means of communications link 228. Mainframe computer 227 may also be coupled to a storage device 229 which may serve as remote storage for Local Area Network (LAN) 221. A second Local Area Network (LAN) 222 may be coupled to Local Area Network (LAN) 221 via communications controller 231 and communications link 232 to a gateway server 233. Gateway server 233 is preferably an individual computer or Intelligent Work Station (IWS), which serves to link Local Area Network (LAN) 222 to Local Area Network (LAN) 221. As discussed above with respect to Local Area Network (LAN) 222 and Local Area Network (LAN) 221, a plurality of data processing procedures or documents may be stored within storage device 229 and controlled by mainframe computer 227, as Resource Manager or Library Service for the data processing procedures and documents thus stored. Of course, those skilled in the art will appreciate that mainframe computer 227 may be located a great geographical distance from Local Area Network (LAN) 221 and similarly Local Area Network (LAN) 221 may be located a substantial distance from Local Area Network (LAN) 224. That is, Local Area Network (LAN) 224 may be located in California while Local Area Network (LAN) 221 may be located within Texas and mainframe computer 227 may be located in New York.

Figure 3:
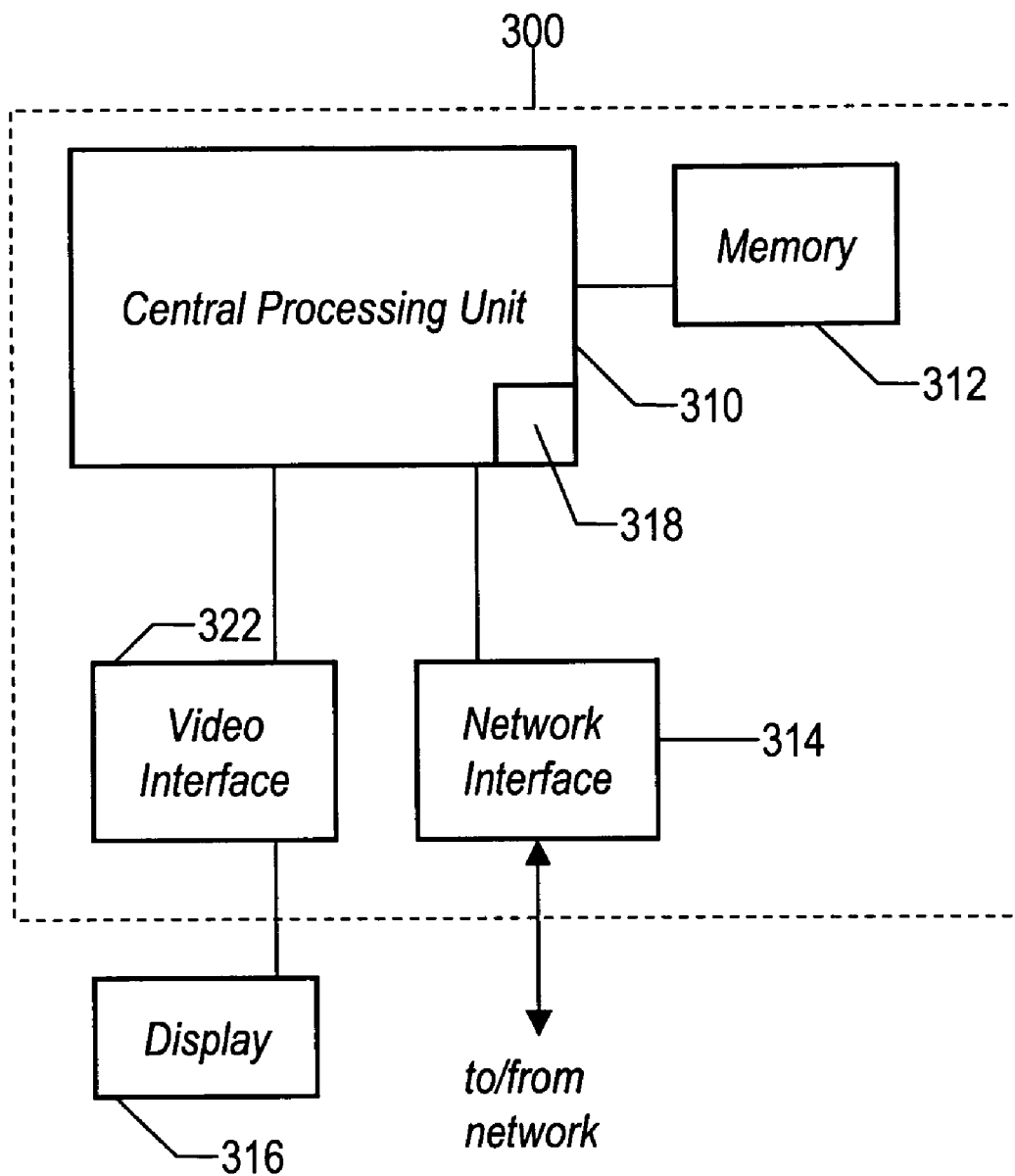
FIG. 3 is a block diagram of a network computer device in accordance with the present invention.

FIG. 3 illustrates a block diagram of one embodiment of the internal components of a computer device in accordance with the present invention. This computing device comprises a system board 300 and display 316 as well as a computer card. As seen, a network computer system board 300 may include a central processing unit (CPU) 310, a memory 312, a network interface 314, a power management module 318 and a video interface 322. The central processing unit 310 may be a microprocessor such as any conventional commercial processor. The memory 312 may include random access memory (RAM), read only memory (ROM), electrically erasable programmable read only memory (EEPROM) or other types of memory known to those of skill in the art. Furthermore, the memory 312 may include cache such as a level 2 (L2) cache, an instruction cache, a data cache or any combination thereof.

The power management unit 318 of the present invention provides for manipulating the various components of the computer 300 in order to regulate or control the power consumed by the computer 300. For example, the power management unit 318 may disable the network interface 314, the memory 312, the non-power management functions of the central processing 310, the video interface 322 and the display 316 when a user is not utilizing the computer 300. Thus, when no user is present, the computer device may require only minimal power. Furthermore, some subsystems can be placed in power-saving modes independent of each other and some can be placed in power-saving modes even when a user is present and active.

As is illustrated in FIG. 3, the power management unit 318 may be incorporated into the central processing unit as computer program code executing on the central processing unit or a combination of computer program code and hardware associated with the central processing unit. In the alternate, power management unit 318 may be independent of the central processing unit 310 in order to minimize power utilized when no user is utilizing the network computer.

Figure 4:
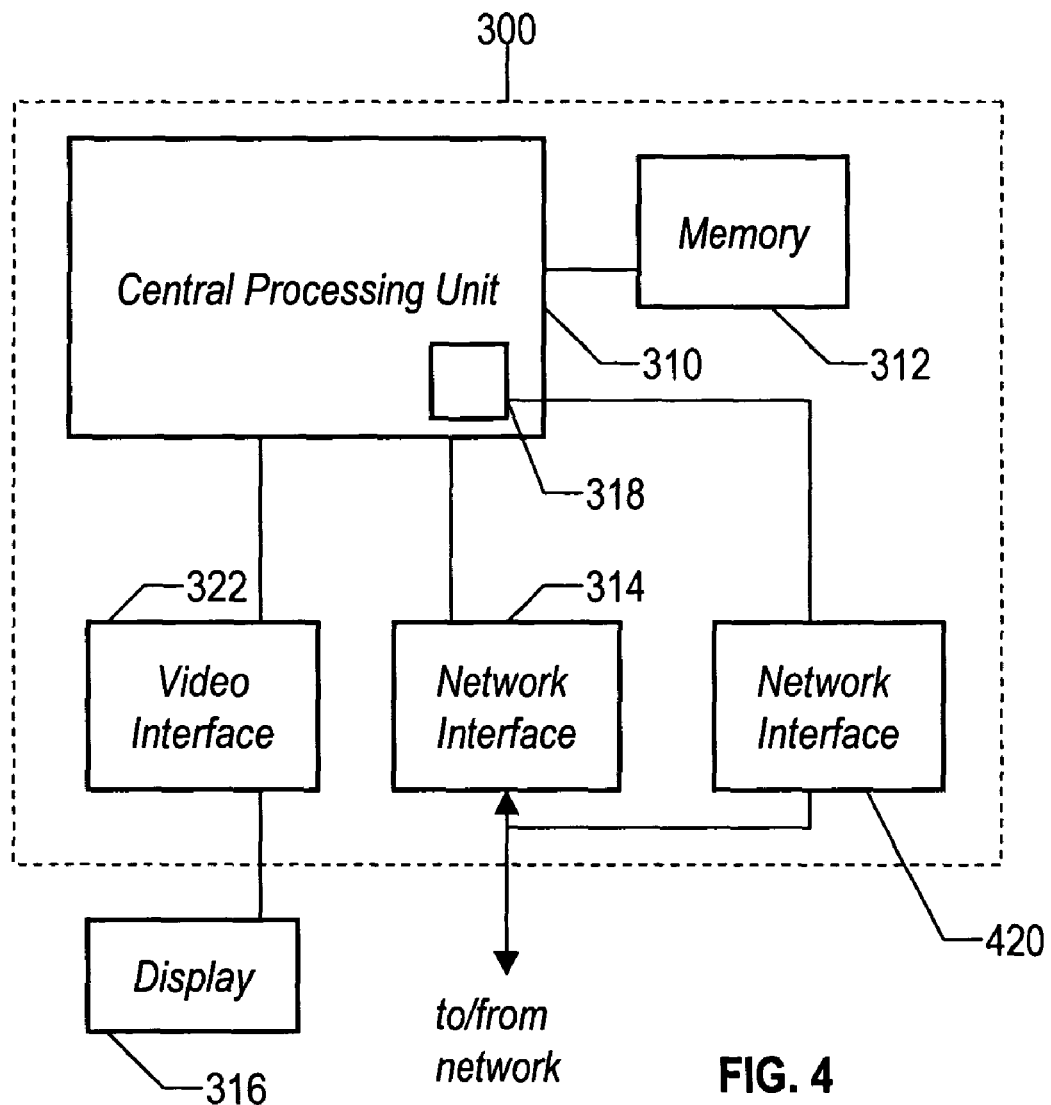
FIG. 4 is a block diagram of a computer card having information receiving and information transmitting capabilities.
Figure 5:
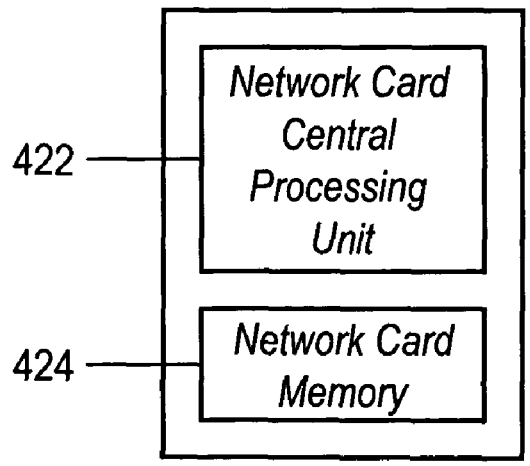
FIG. 5 is a block diagram of a network card used in the implementation of the present invention.

FIG. 4 illustrates the system board of FIG. 3 with a network card 420 incorporated into a computer device. This implementation forms the computer board of the present invention. As shown in FIG. 5, the network card 420 may be a smart card in that a central processing unit 422 and memory 424 are provided on the network card 420. The network card 420 can be incorporated into the computer. The computer central processing unit 310 may communicate with the smart card central processing unit 422. The network card 420 allows for secure information to be stored in the network card memory 424 in an encrypted format. Thus, computer information including a user identification and password as well as information about the characteristics of that computing device may be stored on the network card 420 in a secure format. This encryption feature is important because the network card 420 has the ability to communicate across a computing network independent of the computer. The user may change information on the network card during a normal power on state of the computing device. As shown in FIG. 4, to facilitate communication across a computing network card 420 and the network interface 314 are tied to the same interface connection. In an alternate embodiment, the network card can have a separate input/output means to allow communication with the computing network.

In operation, the network card could receive a signal from the power management unit 318 when the computing device goes into hibernate or power off mode. This signal could activate the network card. When the computer goes into power on mode, the network card could go into a hibernate mode. In the alternative, the network card could be in a constant on mode regardless of the mode of the computing device.

With either embodiment, when the computing device goes into a hibernate mode or turned off, the power management unit 318 of the network computer maintains the computer in a low power state. This state may include providing no or only minimal power to the display 316, the network interface 314, the video interface 313, and the memory 312. Furthermore, the non-power management functions of the central processing unit may also be curtailed so that the central processing unit utilizes a minimum of power. This may also include reducing the operating frequency of the central processing unit to further conserve energy. Sufficient power may then be provided to the network card 420 to allow accessing the card.

Figure 6:
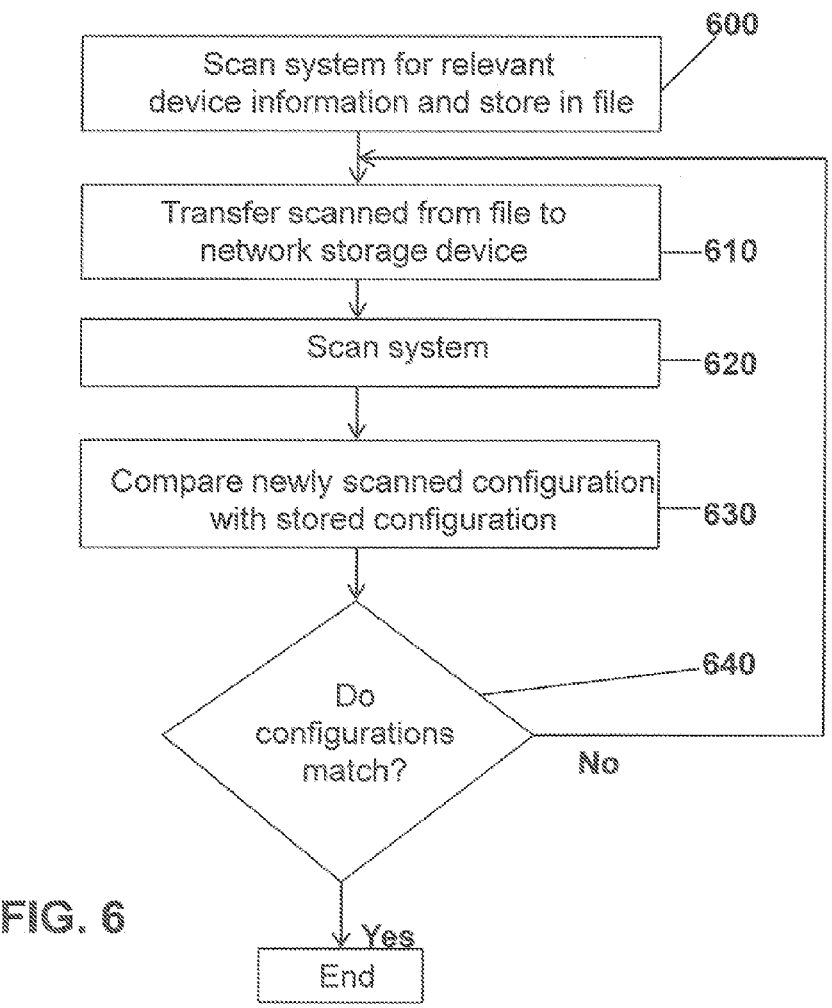
FIG. 6 is a flow diagram of the steps involved in the initial gathering of the machine configuration information.

The method of the invention can be implemented through software modules stored in the CPU 310 and the network card CPU 422. The implementation occurs in the context of a system inventory. This inventory discovers and stores all hardware and software information on all the computers or machine in a defined computing environment. Software stored in the network card can initial determine a computing device configuration for storage in the system inventory. FIG. 6 illustrates the steps in such a computer configuration routine. Step 600 initially performs a scan of the hardware and software components of the computing device. As the scan is executing, the information determined during this scan can be stored in a temporary location such as a buffer in the smart card processing unit. At the completion of the scan, step 610 transfers the scanned information to the network storage device memory card 424. Step 620 performs periodic scans of the computing device configuration. These scans can occur at a predetermined time interval or they can be in response to some computing machine or system event. When a new scan of the device is performed, step 630 performs a comparison of the newly scan machine configuration with the most recently stored computer device configuration. In step 640, there is a determination of whether the compared configurations match. If the configurations match, then there is no need to save the newly scan configuration information. Therefore from step 640, the routine goes back to step 620 to begin a new scan at some point. If the configurations do not match, the routine goes to step 610 to transfer the new computer configuration information to the network storage device memory. At this point, the steps of the routine repeat in order to maintain the storage of a current computer configuration.

Figure 7:
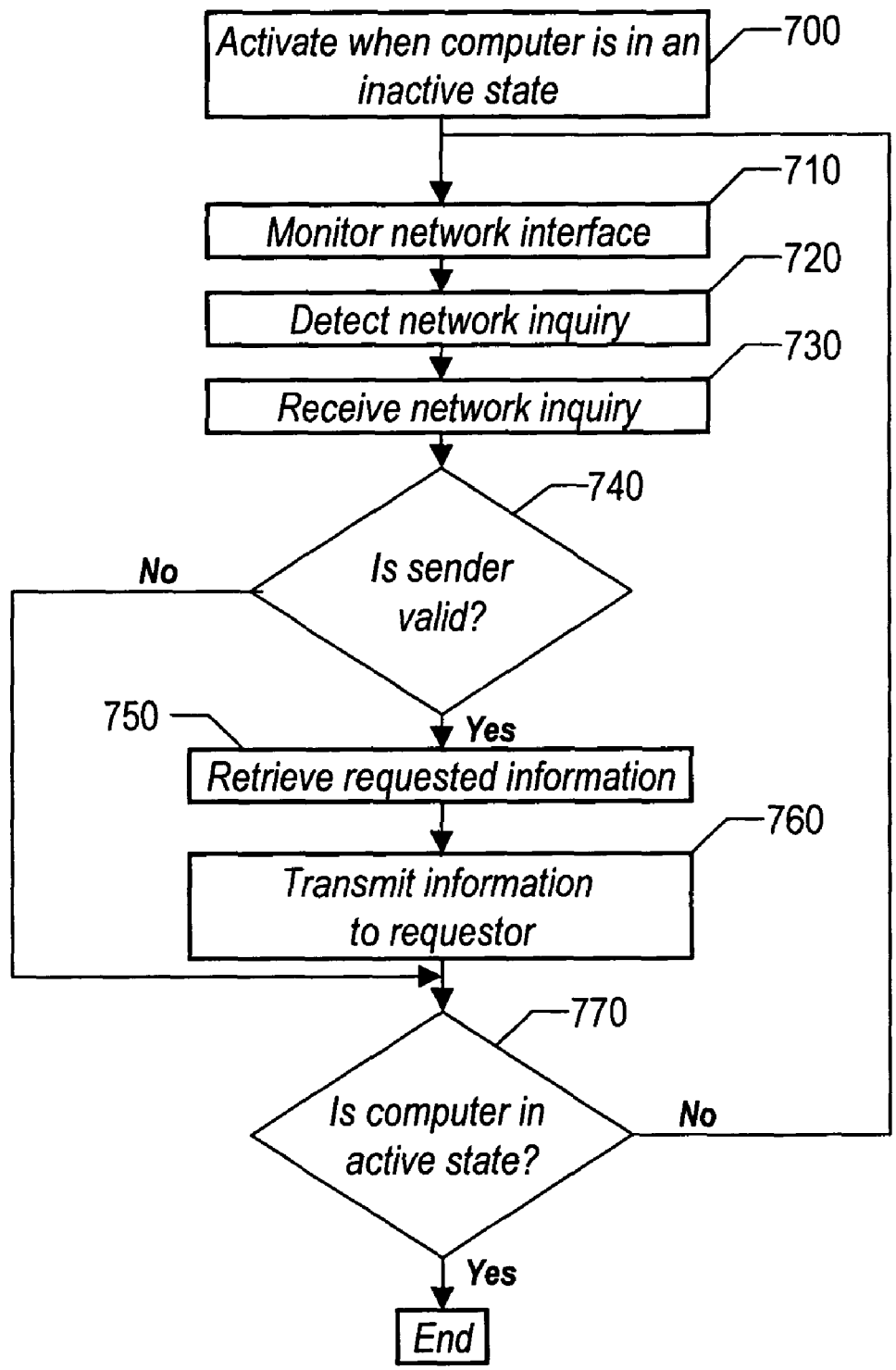
FIG. 7 is a flow diagram of the steps in the implementation of the method of the present invention.

FIG. 7 is a flow diagram of the steps in the implementation of the method of the present invention. This routine can be implemented within the network card and can be in communication with the routine described in FIG. 6 and a system administrator. In this routine, step 700 activates the network card software. This activation can be initiated by the power management unit when the computing device goes into a hibernate or power or mode. The activation initializes the monitoring software in the network card 420. In step 710, the activated network card goes into a monitoring mode and monitors the network for any inquiries transmitted to the computing device. The network card remains in monitor mode. Step 720 detects an inquiry sent to the computing device from a network administrator. Step 730 receives the network administrator inquiry and performs initial processing on the inquiry. As part of the processing function, step 740 identifies the sender and makes a determination of whether the sender of the inquiry has the right to send an inquiry or communicate with the computing device. This determination step 740 can be performed as a security measure. One such validation process is to have a particular byte code sequence that the network device is listening for before sending information to the requestor. The byte code could contain information that identifies the system manager is the source of the request. If the determination is that the sender is not valid, the process can move to step 770 and check to determine if the computing device is in an active state. If the computer is not in an active state, the communication with the network card of the computing device ends. If the determination is that the sender is a valid sender, the process moves to step 750, which retrieves the requested information. In this transfer, the information would be that information that was stored in the network memory card in step 610. In a typical application, an inquiry would be in the process of performing an inventory of the computing system. In this inquiry, the network system administrator is looking for basic characteristic information about the computing device. In some network cards, this information may be the only information stored on the card. In that case, the retrieval step does not require any determination or selection of information. Step 760 transmits the requested information to the network requestor. Following this transmission, as mentioned step 770 that makes a determination of whether the computing device is still in a hibernate or power off state. If the computing device is in such a state, the method returns to the monitoring activity in step 710.

Figure 8:
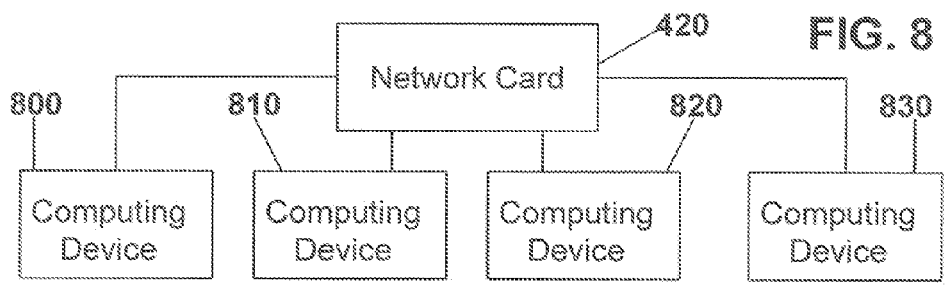
FIG. 8 is a block diagram of a network configuration with one network card device supporting multiple computing devices.

FIG. 8 illustrates an alternate embodiment of the present invention in which configuration information for multiple computing devices could be managed from one network card in one system location. In this system, one network card 420 would be connected to multiple computing devices 800, 810, 820 and 830. The computing devices would be similar to the device shown in FIG. 4. The network card could be housed in one of the computing devices or it could be a separate device in the computing system. The communication between the network card and any device could through conventional connections and communication means.

Figure 9:
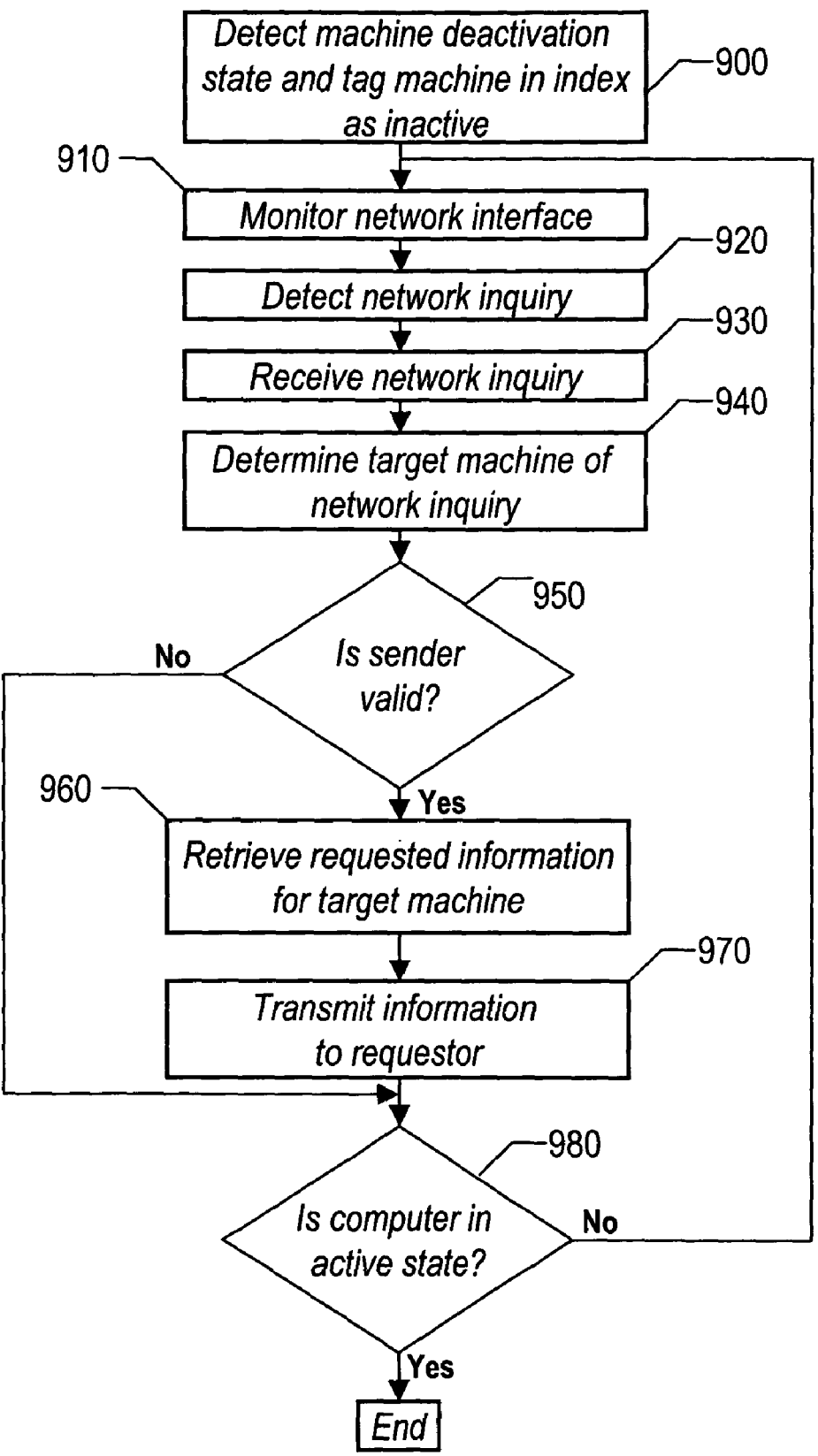
FIG. 9 is a flow diagram of the steps in an alternate implementation of the method of the present invention.

FIG. 9 illustrates the steps in the implementation of method the present in the context of a network card supporting multiple computing devices as shown in FIG. 8. In this implementation, steps 900, 910, 920 and 930 are the same as steps 700, 710, 720 and 730 of FIG. 7 respectively. Prior to step 900, each computing device would transfer to the network card 420 the current configuration information for that device. This process would basically the same as the process described in FIG. 4. Step 940 identifies the target computing device of the inquiry. This identification could be based on a unique byte code for each connected computing device. At this point, step 950 identifies the sender and makes a determination of whether the sender of the inquiry has the right to send an inquiry or communicate with the computing device. The byte code sequence could also be used as part of this validation of the requesting device. If the determination is that the sender is not valid, the process can move to step 980 and check to determine if the computing device is in an active state. If the computer is not in an active state, the communication with the network card of the computing device ends. If the determination is that the sender is a valid sender, the process moves to step 960, which retrieves the requested information. In this transfer, the information would be that information that was stored in the network memory card in step 610. In a typical application, an inquiry would be in the process of performing an inventory of the computing system. In this inquiry, the network system administrator is looking for basic characteristic information about the computing device. In some network cards, this information may be the only information stored on the card. In that case, the retrieval step does not require any determination or selection of information. Step 970 transmits the requested information to the network requester. Following this transmission, as mentioned step 980 that makes a determination of whether the computing device is still in a hibernate or power off state. If the computing device is in such a state, the method returns to the monitoring activity in step 910.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A computing device connected to a computer network comprising:
   a central processing unit;
   a memory operatively associated with the central processing unit;
   a network interface operatively associated with the central processing unit;
   a network card, said network card comprising a network card central processing unit and a card memory operatively associated with the network card central processing and said network card configured to receive and store information about characteristics of said computing device and further configured to transmit stored information across the computer network when said computing device transmitting said stored information is in a hibernate or power off state; and
   a power management controller, operatively associated with said network card, said power management controller configured to control the power state of said computing device, said power management controller is further configured to monitor the power state of the computing device and automatically signals the network card to activate the network card when said computing device goes into a hibernate or power off status and to deactivate when the computing device powers on.

2. The computing device as described in claim 1 wherein said power management controller is further configured to deactivate the network card when said computing device is in an active status.

3. The computing device as described in claim 1 wherein said network card is further configured to validate a source of any received inquiry.

4. The computing device as described in claim 1 wherein said network card further comprises a configuration collection routine, said configuration collection routine scans a computing device, collects computing device configuration information, transfers the collected configuration information to the network memory card.

5. The computing device as described in claim 1 further comprising a second network interface operationally associated with said network card to facilitate interaction the computer network.

6. The computing device as described in, claim 1 wherein said network card is detachable from said computing device and is insert able into said computing device.

7. A method for a computing device connected to a computing network to communicate over the computer network when said computing device is in a hibernate or power off state comprising the steps of:
- storing computing device information on a network card;
- detecting when the computing device goes into a hibernate or power off state;
- activating a network card communication component of said computer device, when the computing device goes into a hibernate or power off state based on monitoring a power state of the computing device and automatically signaling the network card to activate the network card;
- detecting a network inquiry at the network card, the inquiry being transmitted over the computer network;
- determining at the network card the source of the inquiry;
- verifying whether the source of the inquiry has authorization to request information from the computing device;
- retrieving information requested in the inquiry;
- transmitting the retrieved information over the computer network to a source of the inquiry; and
- deactivating the network card communication component of said computer device, when the computing device goes into a power on state.

8. The method as described in claim 7 further comprising before said detecting step, the step of storing computing device information on a network card within said computer, the network card having the capability to communicate over the computer network when said computing device is in a hibernate or power off state.

9. The method as described in claim 7 further comprising before said retrieving step, the step of determining the requested information from the received inquiry and identifying the location of the identified information.

10. The method as described in claim 7 further comprising before said detecting step, the steps of: storing computing device information on a network card; detecting the insertion of the network card into the computing device; establishing network card communication in the computing device, the computer, the network card having the capability to communicate over the computer network when said computing device is in a hibernate or power off state.

11. A system for a computing device connected to a computing network to communicate computer device configuration information over the computer network when the computing device is in a hibernate or power off state comprising:
- a computing device having a network card, said network card comprising a card central processing unit and a card memory operatively associated with the network card central processing and said network card configured to receive and store information about characteristics of said computing device and further configured to transmit stored information across the computer network when said computing device is in a hibernate or power off state, said network card configured to detect when the computing device goes into a hibernate or power off state, further configured to monitor power state of the computing device and automatically signaling the network card to activate when the computing device goes into a hibernate or power off state and furthered configured to deactivate when the computing device goes into a power on state;
- a configuration collection routine, said configuration collection routine scans a computing device, collects computing device configuration information, transfers the collected configuration information to the network memory card; and
- a network system manager in communication with said computing device, said network system manager capable of requesting computing device configuration information and receiving configuration status information from a computing device when the computing device is in a hibernate state.

12. The system as described in claim 11 wherein said network system manager further comprises an inventory of computing devices on a network and the configuration status of each computing device.

* * * * *